(12) United States Patent
Wei et al.

(10) Patent No.: US 11,688,138 B2
(45) Date of Patent: *Jun. 27, 2023

(54) METHODS AND SYSTEMS FOR DETECTING AND COMBINING STRUCTURAL FEATURES IN 3D RECONSTRUCTION

(71) Applicant: Magic Leap, Inc., Plantation, FL (US)

(72) Inventors: Xiaolin Wei, Fremont, CA (US); Yifu Zhang, San Jose, CA (US)

(73) Assignee: Magic Leap, Inc., Plantation, FL (US)

( * ) Notice: Subject to any disclaimer, the term of this patent is extended or adjusted under 35 U.S.C. 154(b) by 84 days.

This patent is subject to a terminal disclaimer.

(21) Appl. No.: 17/512,834

(22) Filed: Oct. 28, 2021

(65) Prior Publication Data

US 2022/0122322 A1 Apr. 21, 2022

Related U.S. Application Data

(63) Continuation of application No. 16/719,832, filed on Dec. 18, 2019, now Pat. No. 11,189,093, which is a (Continued)

(51) Int. Cl.
*G06T 7/33* (2017.01)
*G06T 17/20* (2006.01)

(52) U.S. Cl.
CPC ............... *G06T 17/20* (2013.01); *G06T 7/33* (2017.01); *G06T 2207/10028* (2013.01); *G06T 2207/30244* (2013.01)

(58) Field of Classification Search
None
See application file for complete search history.

(56) References Cited

U.S. PATENT DOCUMENTS 7,003,136 B1   2/2006 Harville
8,633,970 B1   1/2014 Mercay et al.
(Continued)

FOREIGN PATENT DOCUMENTS

JP   2004234349       8/2004
JP   2013053915 A     3/2013
(Continued)

OTHER PUBLICATIONS

Afzal et al., "RGB-D Multi-view System Calibration for Full 3D Scene Reconstruction", 22nd International Conference on Pattern Recognition, IEEE, 2014, pp. 2459-2464.
(Continued)

*Primary Examiner* — Steven Z Elbinger
(74) *Attorney, Agent, or Firm* — Kilpatrick Townsend & Stockton LLP

(57) ABSTRACT

A method for updating camera poses includes receiving a set of captured depth maps associated with a scene and detecting a first shape and a second shape present in the scene. The method also includes, for each of the first shape and the second shape, creating a 3D mesh, creating a virtual camera associated with the 3D mesh, and rendering a depth map associated with the virtual camera. The method further includes identifying a subset of the captured depth maps such that each captured depth map in the subset contains at least a portion of either the first shape or the second shape. The method additionally includes updating the physical camera poses by jointly solving for the physical camera poses by optimizing an alignment between the first depth map, the second depth map, and the subset of the set of captured depth maps.

20 Claims, 14 Drawing Sheets

Related U.S. Application Data continuation of application No. 15/274,823, filed on Sep. 23, 2016, now Pat. No. 10,559,127.

(60) Provisional application No. 62/232,833, filed on Sep. 25, 2015.

(56) References Cited

U.S. PATENT DOCUMENTS

| | | | |
|---|---|---|---|
| 8,884,948 | B2 | 11/2014 | Turner et al. |
| 9,102,055 | B1 | 8/2015 | Konolige et al. |
| 9,373,190 | B2 | 6/2016 | Wei et al. |
| 10,559,127 | B2 | 2/2020 | Wei et al. |
| 11,189,093 | B2 | 11/2021 | Wei et al. |
| 2002/0095267 | A1 | 7/2002 | Knorpp et al. |
| 2003/0043270 | A1 | 3/2003 | Rafey et al. |
| 2011/0169925 | A1 | 7/2011 | Soucy et al. |
| 2011/0187704 | A1 | 8/2011 | Chen et al. |
| 2012/0007943 | A1 | 1/2012 | Tytgat |
| 2012/0075342 | A1 | 3/2012 | Choubassi et al. |
| 2012/0113109 | A1 | 5/2012 | Lee |
| 2013/0202197 | A1 | 8/2013 | Reeler et al. |
| 2014/0206443 | A1* | 7/2014 | Sharp ............... G06T 7/593 463/31 |
| 2014/0285634 | A1* | 9/2014 | Rhoads ............ G06T 17/00 348/47 |
| 2014/0294247 | A1 | 10/2014 | Sirault et al. |
| 2015/0146926 | A1 | 5/2015 | Ramachandran et al. |
| 2015/0181198 | A1 | 6/2015 | Baele et al. |
| 2015/0254857 | A1 | 9/2015 | Huang et al. |
| 2015/0279083 | A1 | 10/2015 | Pradeep et al. |
| 2016/0147230 | A1 | 5/2016 | Munich et al. |
| 2017/0091996 | A1 | 3/2017 | Wei et al. |
| 2017/0221226 | A1 | 8/2017 | Shen et al. |
| 2020/0126298 | A1 | 4/2020 | Wei et al. |

FOREIGN PATENT DOCUMENTS

| | | |
|---|---|---|
| JP | 2014032666 A | 2/2014 |
| JP | 2014185947 | 10/2014 |
| KR | 20140037936 A | 3/2014 |

OTHER PUBLICATIONS

U.S. Appl. No. 15/274,823, Advisory Action dated Nov. 26, 2018, 6 pages.
U.S. Appl. No. 15/274,823, Final Office Action dated Jul. 31, 2019, 18 pages.
U.S. Appl. No. 15/274,823, Final Office Action dated Aug. 10, 2018, 25 pages.
U.S. Appl. No. 15/274,823, Non-Final Office Action dated Feb. 2, 2018, 22 pages.
U.S. Appl. No. 15/274,823, Non-Final Office Action dated Feb. 25, 2019, 23 pages.
U.S. Appl. No. 15/274,823, Notice of Allowance dated Sep. 25, 2019, 8 pages.
U.S. Appl. No. 16/719,832, Non-Final Office Action dated Nov. 4, 2020, 22 pages.
U.S. Appl. No. 16/719,832, Notice of Allowance dated Apr. 29, 2021, 8 pages.
U.S. Appl. No. 16/719,832, Notice of Allowance dated Jul. 30, 2021, 8 pages.
Australian Application No. 2016327985, First Examination Report dated Jul. 31, 2020, 4 pages.
Chinese Application No. 201680054286.9, Office Action dated Oct. 15, 2021, 19 pages (13 pages of Original Document and 6 pages of English Translation).
European Application No. 16849766.7, Extended European Search Report dated Feb. 1, 2019, 12 pages.
European Application No. 16849766.7, Office Action dated Jul. 10, 2020, 5 pages.
European Application No. 16849766.7, Office Action dated Jan. 7, 2020, 6 pages.
European Application No. 16849766.7, Partial Supplementary European Search Report dated Oct. 25, 2018, 13 pages.
Israel Application No. 257634, Office Action dated Jan. 26, 2021, 6 pages (3 pages of Original Document and 3 pages of English Translation).
Indian Application No. 201847004522, First Examination Report dated Jul. 24, 2021, 10 pages.
Japanese Application No. 2018-514855, Office Action dated Oct. 2, 2020, 15 pages (3 pages of Original Document and 12 pages of English Translation).
Japanese Application No. 2018-514855, Office Action dated Jan. 29, 2021, 8 pages (2 pages of Original Document and 6 pages of English Translation).
Newcombe et al., KinectFusion: Real-Time Dense Surface Mapping and Tracking, Mixed and Augmented Reality (Ismar), 10th IEEE international symposium on, IEEE, Oct. 26, 2011, pp. 127-136.
New Zealand Application No. 739813, First Examination Report dated Jun. 23, 2020, 3 pages.
New Zeeland Application No. 739813, Second Examination Report dated Jan. 27, 2021, 2 pages.
New Zeeland Application No. 739813, Third Examination Report dated Mar. 2, 2021, 1 page.
Okorn et al., Toward Automated Modeling of Floor Plans, Proceedings of the Symposium on 3D Data Processing, Visualization and Transmission, vol. 2, May 17, 2010, 8 pages.
International Application No. PCT/US2016/053477, International Preliminary Report on Patentability dated Apr. 5, 2018, 9 pages.
International Application No. PCT/US2016/053477, International Search Report and Written Opinion dated Dec. 15, 2016, 10 pages.
Yu et al., Semantic Alignment of Lidar Data at City Scale, IEEE Conference on Computer Vision and Pattern Recognition (CVPR). IEEE, Jun. 7, 2015, pp. 1722-1731.
Zhu et al., Local Readjustment for High-Resolution 3D Reconstruction, IEEE Conference on Computer Vision and Pattern Recognition, Jun. 23, 2014, pp. 3938-3945.
Application No. AU2021204409, "First Examination Report", dated Aug. 30, 2022, 2 pages.
Application No. KR10-2018-7010984, "Office Action" and English translation, dated Jul. 19, 2022, 9 pages.
Application No. CA2,996,009 , "Office Action", dated Jan. 19, 2023, 4 pages.
Application No. EP21191717.4, Extended European Search Report, dated Feb. 24, 2022, 11 pages.
Hernandez et al., "Point Cloud Segmentation towards Urban Ground Modeling", 2009 IEEE, Joint Urban Remote Sensing Event, 2009, pp. 1-5.

* cited by examiner

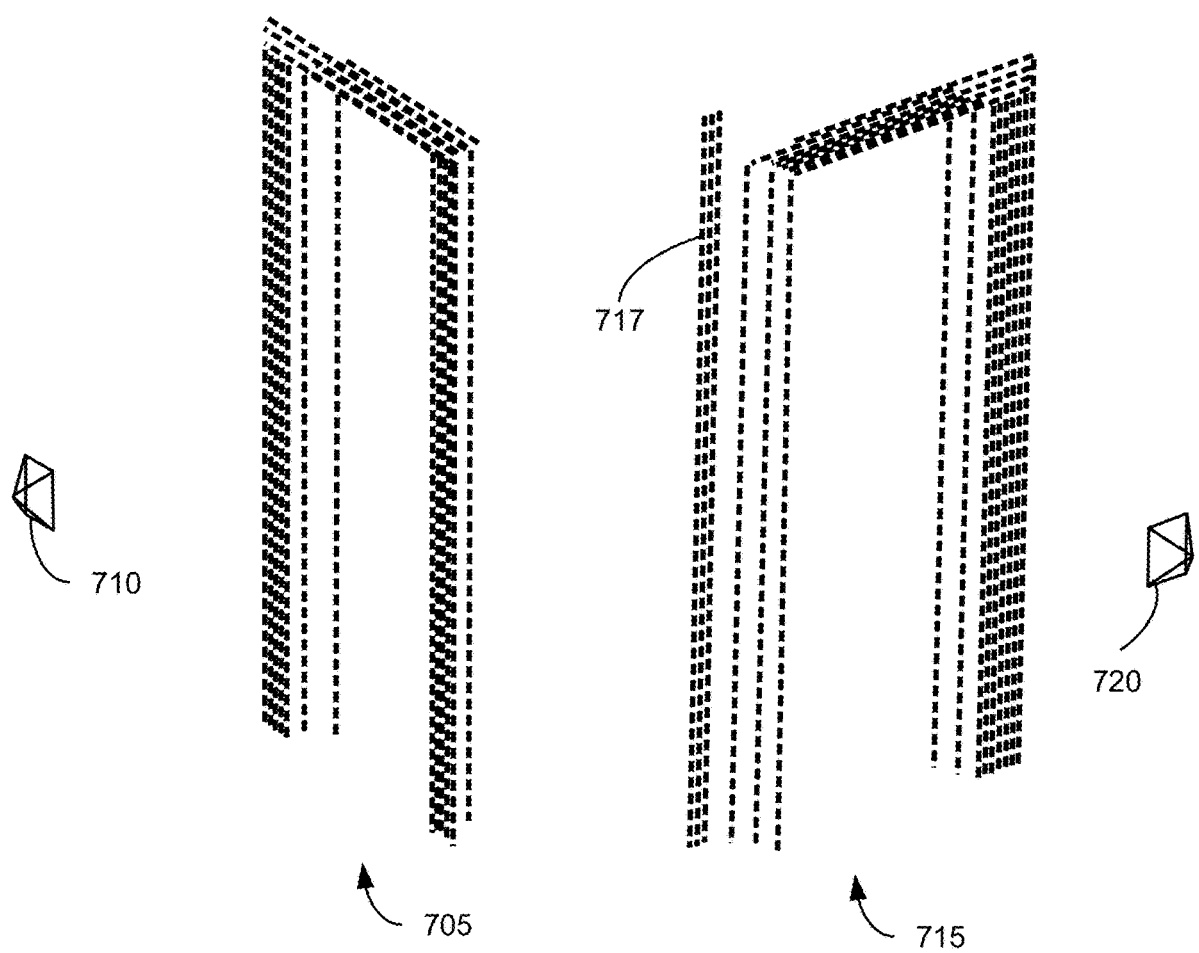
FIG. 7A  FIG. 7B

METHODS AND SYSTEMS FOR DETECTING AND COMBINING STRUCTURAL FEATURES IN 3D RECONSTRUCTION

CROSS-REFERENCES TO RELATED APPLICATIONS

This application is a continuation of U.S. patent application Ser. No. 16/719,832, filed on Dec. 18, 2019, entitled "METHODS AND SYSTEMS FOR DETECTING AND COMBINING STRUCTURAL FEATURES IN 3D RECONSTRUCTION," which is a continuation of U.S. patent application Ser. No. 15/274,823, filed on Sep. 23, 2016, U.S. Pat. No. 10,559,127, issued on Feb. 11, 2020, entitled "METHODS AND SYSTEMS FOR DETECTING AND COMBINING STRUCTURAL FEATURES IN 3D RECONSTRUCTION," which is a non-provisional of and claims the benefit of and priority to U.S. Provisional Patent Application No. 62/232,833, filed on Sep. 25, 2015, entitled "METHODS AND SYSTEMS FOR DETECTING AND COMBINING STRUCTURAL FEATURES IN 3D RECONSTRUCTION," the disclosures of which are hereby incorporated by reference in their entirety for all purposes.

SUMMARY OF THE INVENTION

The present invention relates generally to the field of computerized three-dimensional (3D) image reconstruction, and more particularly, to methods and systems for detecting and combining structural features in 3D reconstruction.

As described herein, embodiments of the present invention are directed to solving issues not sufficiently addressed by conventional techniques, as well as providing additional features that will become readily apparent by reference to the following detailed description when taken in conjunction with the accompanying drawings.

Some embodiments disclosed herein are directed to methods and systems providing for shape-aware 3D reconstruction. Some implementations incorporate improved shape-aware techniques, such as shape detection, shape-aware pose estimation, shape-aware volumetric fusion algorithms, and the like.

According to an embodiment of the present invention, a method for forming a reconstructed 3D mesh is provided. The method includes receiving a set of captured depth maps associated with a scene, performing an initial camera pose alignment associated with the set of captured depth maps, and overlaying the set of captured depth maps in a reference frame. The method also includes detecting one or more shapes in the overlaid set of captured depth maps and updating the initial camera pose alignment to provide a shape-aware camera pose alignment. The method further includes performing shape-aware volumetric fusion and forming the reconstructed 3D mesh associated with the scene.

According to another embodiment of the present invention, a method of detecting a shape present in a scene is provided. The method includes determining a vertical direction associated with a point cloud including a plurality of captured depth maps and forming a virtual plane orthogonal to the vertical direction. The method also includes projecting the points of the point cloud onto the virtual plane and calculating projection statistics for the points of the point cloud. The method further includes detecting one or more lines from the calculated projection statistics, the one or more lines being associated with vertical walls and detecting the shape present in the scene from the projection statistics and the one or more detected lines.

According to a specific embodiment of the present invention, a method of performing a shape-aware camera pose alignment is provided. The method includes receiving a set of captured depth maps. Each of the captured depth maps is associated with a physical camera pose. The method also includes receiving one or more detected shapes. Each shape of the one or more detected shapes is characterized by a dimension and location/orientation. The method further includes creating a 3D mesh for each of the one or more detected shapes and creating one or more virtual cameras associated with each 3D mesh in a local reference frame. Additionally, the method includes rendering one or more depth maps. Each of the one or more rendered depth maps is associated with each virtual camera associated with each 3D mesh. Moreover, the method includes jointly solving for the physical camera poses and location/orientation of each shape of the one or more detected shapes by optimizing an alignment between the one or more rendered depth maps and the set of captured depth maps.

In an embodiment, the shape-aware 3D reconstruction method includes one or more of the following steps: performing a pose estimation of a set of captured depth maps; performing a shape detection of aligned poses subsequent to the pose estimation; performing a shape-aware pose estimation upon detected shapes; and based on the aligned poses and shapes, conducting a shape-aware volumetric fusion to generate one or more 3D meshes.

Numerous benefits are achieved by way of the present invention over conventional techniques. For example, embodiments of the present invention provide clean and sharp shapes and edges in 3D meshes, which, as a result, look more realistic than 3D meshes that are not generated using shape-aware 3D reconstruction. Accordingly, the 3D meshes provided by embodiments of the present invention are more comfortable for viewers. Another benefit is that more accurate and robust alignment of captured depth maps is achieved as a result of the existence of detected shapes in the process of 3D reconstruction. Furthermore, an end-to-end 3D reconstruction framework is provided that applies prior knowledge of man-made scenes and, at the same time, maintains flexibility with respect to scene heterogeneity. These and other embodiments of the invention along with many of its advantages and features are described in more detail in conjunction with the text below and attached figures.

BRIEF DESCRIPTION OF THE DRAWINGS

The present disclosure, in accordance with one or more various embodiments, is described in detail with reference to the following figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIG. 7A is a simplified schematic diagram illustrating a rendered depth map associated with an interior view of a door frame and the associated virtual camera according to an embodiment of the present invention.

FIG. 7B is a simplified schematic diagram illustrating a rendered depth map associated with an exterior view of a door frame and the associated virtual camera according to an embodiment of the present invention.

DETAILED DESCRIPTION OF SPECIFIC EMBODIMENTS

Figure 1:
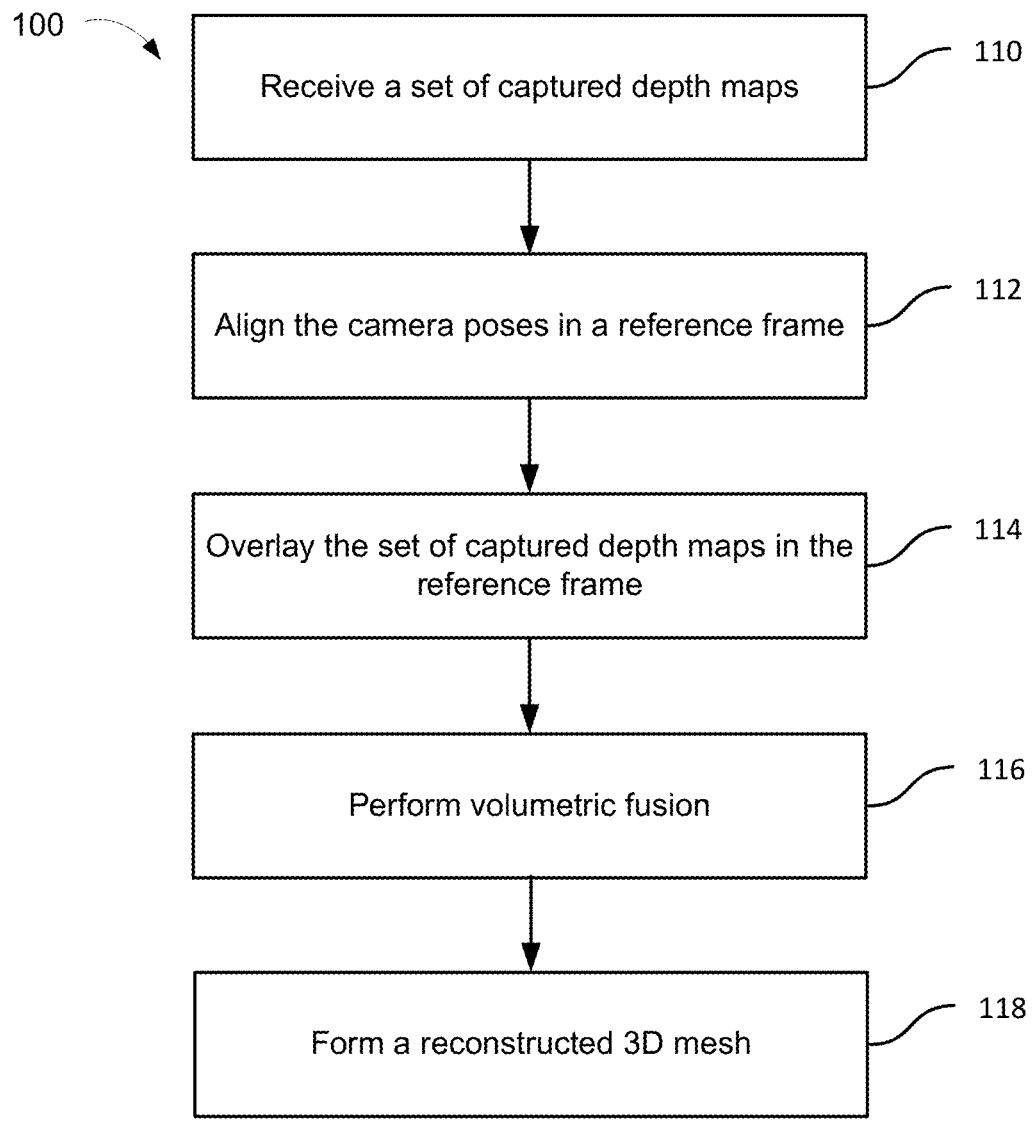
FIG. 1 is a simplified flowchart illustrating a method for creating a 3D mesh of a scene using multiple frames of captured depth maps.

Embodiments of the present invention relate to methods and systems for computerized three-dimensional (3D) scene reconstruction, and more particularly, to methods and systems for detecting and combining structural features in 3D reconstruction.

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, embodiments of the present invention are not intended to be limited to the examples described herein and shown, but is to be accorded the scope consistent with the claims.

The word "exemplary" is used herein to mean "serving as an example or illustration." Any aspect or design described herein as "exemplary" is not necessarily to be construed as preferred or advantageous over other aspects or designs.

Reference will now be made in detail to aspects of the subject technology, examples of which are illustrated in the accompanying drawings, wherein like reference numerals refer to like elements throughout.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Embodiments disclosed herein are directed to methods and systems that provide for shape-aware 3D reconstruction. As described herein, some embodiments of the present invention incorporate improved shape-aware techniques, such as shape detection, shape-aware pose estimation, shape-aware volumetric fusion algorithms, and the like. According to an embodiment of the present invention, the shape-aware 3D reconstruction method can include one or more of the following steps: performing a pose estimation of a set of depth images; performing a shape detection of aligned poses subsequent to the pose estimation; performing a shape-aware pose estimation upon detected shapes; and based on the aligned poses and shapes, conducting a shape-aware volumetric fusion to generate 3D meshes.

3D reconstruction is one of the most sought-after topics in 3D computer vision. It takes images (e.g., colored/gray scale images, depth images, or the like) as inputs and generates 3D meshes (e.g., automatically) representing an observed scene. 3D reconstruction has many applications in virtual reality, mapping, robotics, game, filmmaking, and so forth.

As an example, a 3D reconstruction algorithm can receive input images (e.g., colored/gray scale images, colored/gray scale images +depth images, or depth-only) and, as appropriate, process the input images to form captured depth maps. For example, passive depth maps can be generated using multi-view stereo algorithm from colored images, and active depth maps can be obtained using active sensing technology, such as a structured-light depth sensor. Although the foregoing examples are illustrated, embodiments of the invention can be configured to handle any type of depth maps. One of ordinary skill in the art would recognize many variations, modifications, and alternatives.

FIG. 1 is a simplified flowchart illustrating a method for creating a 3D mesh of a scene using multiple frames of captured depth maps. Referring to FIG. 1, a method to create a 3D model of a scene, for example, a 3D triangle mesh representing the 3D surfaces associated with the scene, from multiple frames of captured depth maps is illustrated. The method 100 includes receiving a set of captured depth maps (110). A captured depth map is a depth image in which each pixel has an associated depth value representing the depth from the pixel to the camera obtaining the depth image. In comparison with a colored image that can have three or more channels per pixel (e.g., RGB image with red, green and blue components), a depth map can have a single channel per pixel (i.e., pixel distance from the camera). The process of receiving the set of captured depth maps can include processing input images, for example, RGB images, to produce one or more captured depth maps, also referred to as a frame of a captured depth map. In other embodiments, the captured depth maps are obtained using a time of flight camera, a LIDAR, stereo cameras, or the like, and are thus received by the system.

The set of captured depth maps includes depth maps from different camera angles and/or positions. As an example, a depth map stream can be provided by a moving depth camera. As the moving depth camera pans and/or moves, the depth maps are produced as a stream of depth images. As another example, a still depth camera could be used to collect multiple depth maps of portions or all of a scene from different angles and/or different positions, or combinations thereof.

The method also includes aligning the camera poses associated with set of captured depth maps in a reference frame (112) and overlaying the set of captured depth maps in the reference frame (112). In an embodiment, the process of pose estimation is utilized to align the depth points from all cameras and to create a locally and globally consistent point cloud in 3D world coordinates. The depth points from the same position in the world coordinate should be aligned as close to each other as possible. Due to inaccuracy present in the depth maps, however, pose estimation is usually not perfect, especially on structural features such as the corners of walls, the ends of walls, door frames in indoor scenes, and the like, which cause artifacts on these structural features when they are present in the generated mesh. Moreover, these inaccuracies can be exacerbated when mesh boundaries are seen as occluders (i.e., objects occluding background objects) because the artifacts will be much more noticeable to the user.

In order to align the camera poses, which indicates the position and orientation of the camera associated with each depth image, the depth maps are overlaid and differences in the positions of adjacent and/or overlapping pixels are reduced or minimized. Once the positions of the pixels in the reference frame have been adjusted, the camera pose is adjusted and/or updated to align the camera pose with the adjusted pixel positions. Thus, the camera poses are aligned in the reference frame (114). In other words, a rendered depth map can be created by projecting the depth points of all depth maps to the reference frame (e.g., a 3D world coordinate system) based on the estimated camera poses.

The method further includes performing volumetric fusion (116) to form a reconstructed 3D mesh (118). The volumetric fusion process can include fusing multiple captured depth maps into a volumetric representation as a discretized version of sign-distance function of the observed scene. The 3D mesh generation can include the use of the marching cubes algorithm or other suitable method to extract a polygonal mesh from the volumetric representation in the 3D space.

In order to reduce the artifacts discussed above, embodiments of the present invention provide methods and systems for performing shape-aware 3D reconstruction, which incorporates improved shape-aware techniques, such as shape detection, shape-aware pose estimation, shape-aware volumetric fusion algorithms, and the like.

For indoor structures, because they are man-made, the structures typically have regular shapes in contrast with organic outdoor structures. Additionally, inexpensive depth cameras can produce captured depth maps that contain a relatively high level of noise, which results in errors in the depth values associated with each pixel. These depth errors can lead to inaccuracies in the camera pose estimation process. These errors can propagate through the system, resulting in errors including noise and inaccuracy in the reconstructed 3D mesh. As examples, wavy or crooked corners of walls, waviness in walls that should be flat, and the like, are not visually pleasing to the user. Accordingly, utilizing embodiments of the present invention, the 3D mesh that is reconstructed is characterized by increased accuracy, reduced noise, and the like, resulting in a 3D mesh that is visually pleasing to the user.

It should be appreciated that the specific steps illustrated in FIG. 1 provide a particular method of creating a 3D mesh of a scene using multiple frames of captured depth maps according to an embodiment of the present invention. Other sequences of steps may also be performed according to alternative embodiments. For example, alternative embodiments of the present invention may perform the steps outlined above in a different order. Moreover, the individual steps illustrated in FIG. 1 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 2:
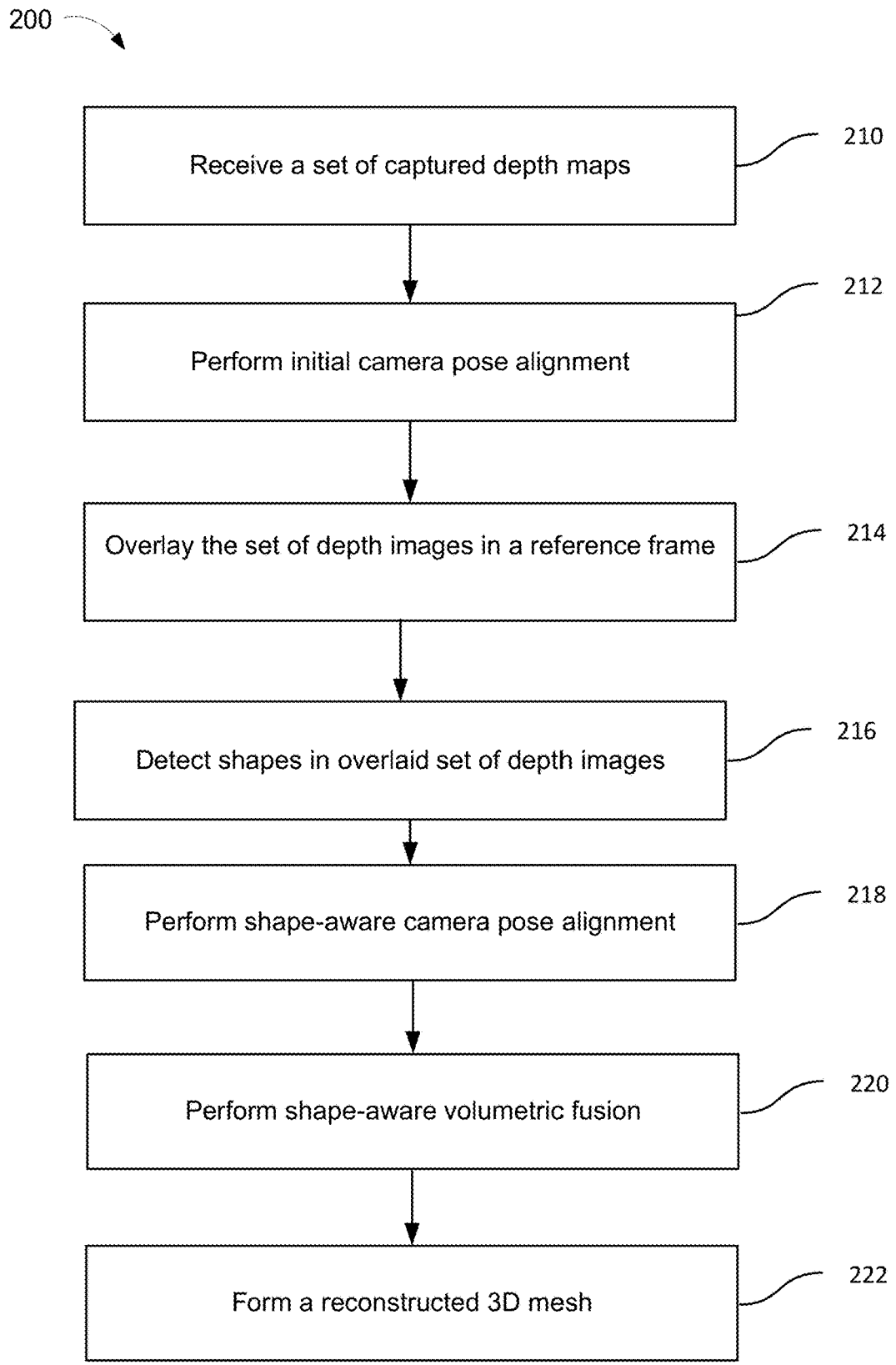
FIG. 2 is a simplified flowchart illustrating a method of generating a 3D mesh of a scene using multiple frames of captured depth maps according to an embodiment of the present invention.

FIG. 2 is a simplified flowchart illustrating a method of generating a 3D mesh of a scene using multiple frames of captured depth maps according to an embodiment of the present invention. The method illustrated in FIG. 2 can be considered as a process for generating a reconstructed 3D mesh from captured depth maps by use of a shape-aware 3D reconstruction method and system.

Referring to FIG. 2, the method 200 includes receiving a set of captured depth maps (210). As discussed in relation to FIG. 1, the set of captured depth maps can be received as depth maps, processed versions of depth maps, or generated from other images to provide a set of captured depth maps. The method also includes performing initial camera pose estimation (212) and overlaying the set of captured depth maps in a reference frame (214). In the initial camera pose estimation, the depth maps are overlaid and differences in the positions of adjacent and/or overlapping pixels are reduced or minimized. Once the positions of the pixels in the reference frame have been adjusted, the camera pose is adjusted and/or updated to align the camera pose with the adjusted pixel positions and provide the initial camera pose estimation.

During this initial refinement of the set of captured depth maps, it is possible that the initial estimates of the camera poses include some inaccuracies. As a result, the overlaid depth maps may exhibit some misalignment, particularly in the regions of structural features. Accordingly, embodiments of the present invention apply shape detection to the aligned camera poses to detect structural shapes, which can have strong characteristics, using the point distribution of a point cloud as described more fully below. As illustrated in FIG.

2, the method includes detecting shapes in the overlaid set of captured depth maps (218).

Figure 3:
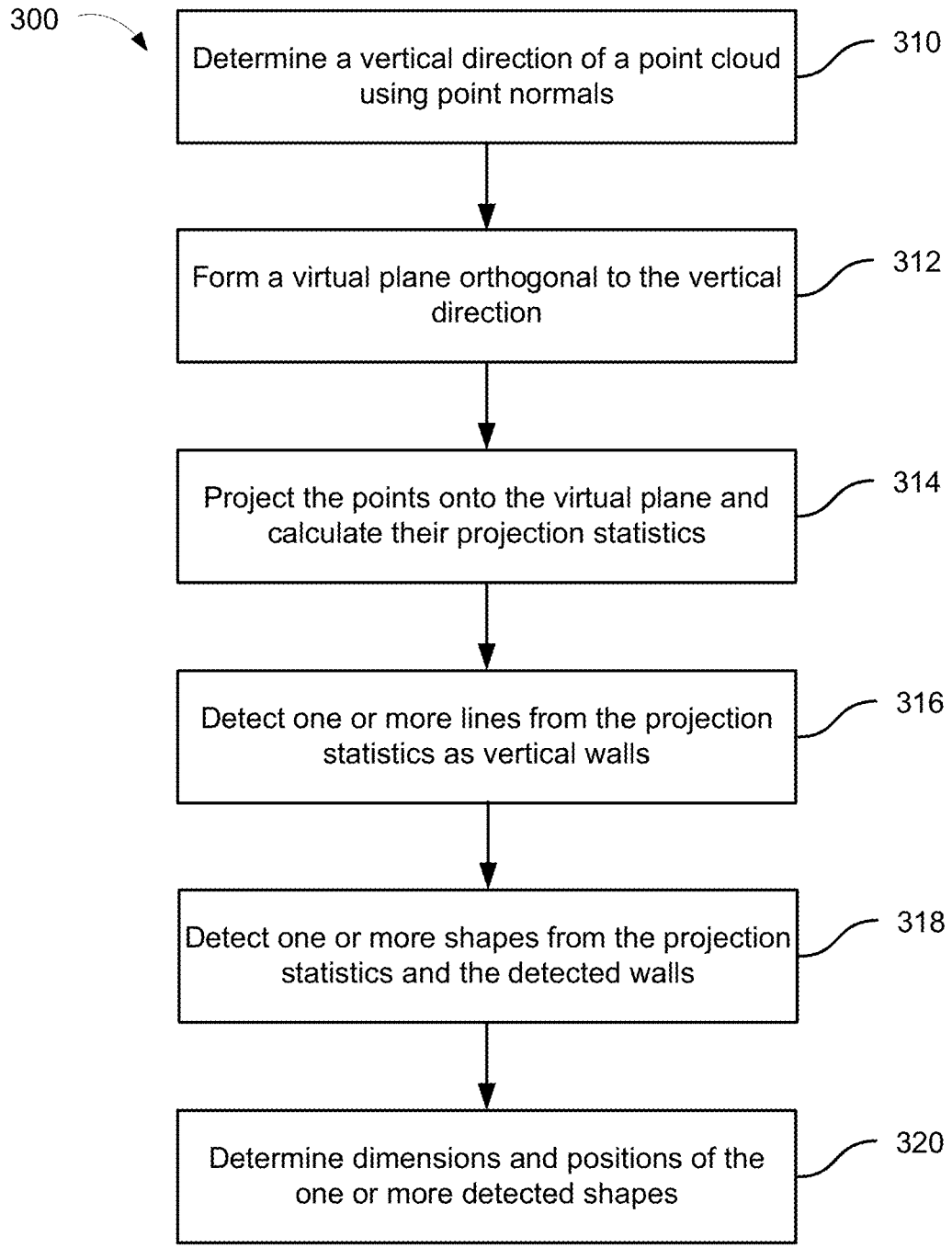
FIG. 3 is a simplified flowchart illustrating a method of detecting a shape present in a point cloud according to an embodiment of the present invention.

FIG. 3 is a simplified flowchart illustrating a method of detecting a shape present in a point cloud according to an embodiment of the present invention. The point cloud can be formed by overlaying the set of captured depth maps in the reference frame. Additional description related to the formation of a point cloud based on captured depth maps, rendered depth maps, or combinations thereof, is provided in relation to FIG. 9. The method illustrated in FIG. 3 is useful for detecting structures such as door frames, windows, wall corners, wall ends, walls, furniture, other man-made structures, and the like that are present in a point cloud.

Although the camera poses can be determined, the relationship of the camera poses to a vertical reference frame may not be known. In some embodiments, the z-axis of the reference frame can be aligned with the direction of gravity. Accordingly, the method 300 includes determining a vertical direction associated with the point cloud using point normals (310). Particularly for indoor scenes, the presence of walls and other structural features can be used in determining the vertical direction associated with the point cloud, also referred to as the vertical direction of the point cloud. For example, for a given pixel in the point cloud, the pixels in the vicinity of the given pixel are analyzed to determine the normal vector for the given pixel. This normal vector is referred to as a point normal. As an example, for a pixel representing a portion of a wall, the neighboring pixels will generally lie in a plane. Thus, the normal vector to the plane can be used to define a normal vector for the pixel of interest.

Given the normal vectors for some or all of the pixels in the point cloud, the direction orthogonal to the normal vectors will define the vertical direction. In other words, the normal vectors will generally lie in parallel, horizontal planes, with the vertical direction orthogonal to these parallel, horizontal planes.

In some embodiments, determining the vertical direction includes estimating the vertical direction and then refining the estimated vertical direction although these steps can be combined into a single process that provides the desired vertical direction vector. One of ordinary skill in the art would recognize many variations, modifications, and alternatives.

The method also includes forming a virtual plane orthogonal to the vertical direction (312) and projecting the points in the point cloud onto the virtual plane orthogonal to the vertical direction and calculating their projection statistics (314). Given the vertical direction, which is aligned with gravity, it is possible to define a plane orthogonal to the vertical direction that will represent a horizontal surface, for example, the floor of a room. This plane orthogonal to the vertical direction can be referred to as a projection plane in addition to the term virtual plane. An example of the projection statistics that are calculated is that a point distribution can be collected for each two dimensional position on the virtual plane.

By projecting the points in the point cloud onto the virtual plane orthogonal to the vertical direction, all of the points in the point cloud can be represented as a two-dimensional data set. This two-dimensional data set will represent the position in x-y space of the point, the height range of the points projected onto the x-y position, and the density of points associated with the x-y position.

For a given position in the projection plane, which can be referred to as x-y space, the density of the points that were projected onto the given position represents the number of points that were present in the point cloud at heights above the given position. As an example, considering a wall with a door in the wall, the density of points at positions under the wall will be high, continuing at a high density until the door frame is reached. The projection onto the projection plane will result in a line running along the bottom of the wall. The density of points for positions under the door frame will be low (only points associated with the top of the door frame and the wall above the door frame). Once the other side of the door frame is reached, the density will increase again.

After projection of the point cloud onto the projection plane, the density of points in the projection plane will effectively provide a floor plan of the scene. Each pixel in the projection plane can have a gray scale value that indicates the number of points associated with the particular pixel that were projected onto the particular pixel. Given the point distribution, the method also includes detecting lines from the projection statistics as vertical walls (316). The projection statistics can be considered as elements of a projection image.

Thus, embodiments of the present invention utilize one or more projection statistics, including the predetermined number of points projected onto a particular x/y location on the 2D virtual plane. Another projection statistic is the distribution of point normals for the points projected onto a particular x/y location. Moreover, another projection statistic is the height range of the points projected onto a particular x/y location. One of ordinary skill in the art would recognize many variations, modifications, and alternatives.

Based on the projection statistics and the one or more detected lines, the method includes detecting one or more shapes (e.g., wall corners, door frames, doors, and the like) (318). The one or more shapes can be different shapes (wall corner and door frame) or multiple examples of a shape (two wall corners in different parts of the room). The inventors have determined that most regular shapes are associated with walls. For example, a wall corner is the connection of two orthogonal walls, a wall end is the end of the wall, and a door frame is an opening in the wall. By analyzing the point distribution, these structural features are identified and detected.

The method also includes determining dimensions and positions of the one or more detected shapes (320). The point height distribution of each two dimensional position above the projection plane, which is available in addition to the density of points projected onto each two dimensional position, can be used to determine the vertical range or extent of the detected shapes. As an example, if a two dimensional position has a number of points, with all the heights being greater than 7 feet, this two dimensional position is likely under a door frame, which is open to the top of the door frame, then solid above the door frame. A histogram can be created for each two dimensional position, with the points projected onto the two dimensional position disposed along the histogram as a function of their height above the projection plane.

In some embodiments, the determination of the dimensions and positions of the one or more detected shapes is a determination of the initial dimension and position of each shape, which is to be parameterized depending on the type of the shape. For example, the two dimensional position, direction, and vertical range are determined for a corner of a wall. For a door frame, the thickness and width can be determined. For a door, the height and width can be determined.

It should be appreciated that the specific steps illustrated in FIG. 3 provide a particular method of detecting a shape present in a point cloud according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Referring once again to FIG. 2, after the shape(s) in the point cloud (i.e., the overlaid set of captured depth images) have been detected, the method includes performing shape-aware camera pose estimation, also referred to as shape-aware camera pose alignment (218). Thus, embodiments of the present invention perform a second camera pose alignment process that is informed by the presence of the shapes detected in the point cloud, thereby providing camera poses associated with each of the set of depth images that are optimized with detected shapes as a constraint. In addition to aligning the camera poses based on overlap between overlaid captured depth maps, embodiments align the camera poses based on the overlap between the overlaid captured depth maps and the detected shapes. By aligning the depth maps to the detected shape, the reconstructed 3D mesh has greater accuracy as a result of the use of the detected shape as an added constraint. By using the detected shape as a constraint, errors that can propagate through the system are reduced or eliminated, resulting in the improved 3D mesh accuracy.

Figure 4:
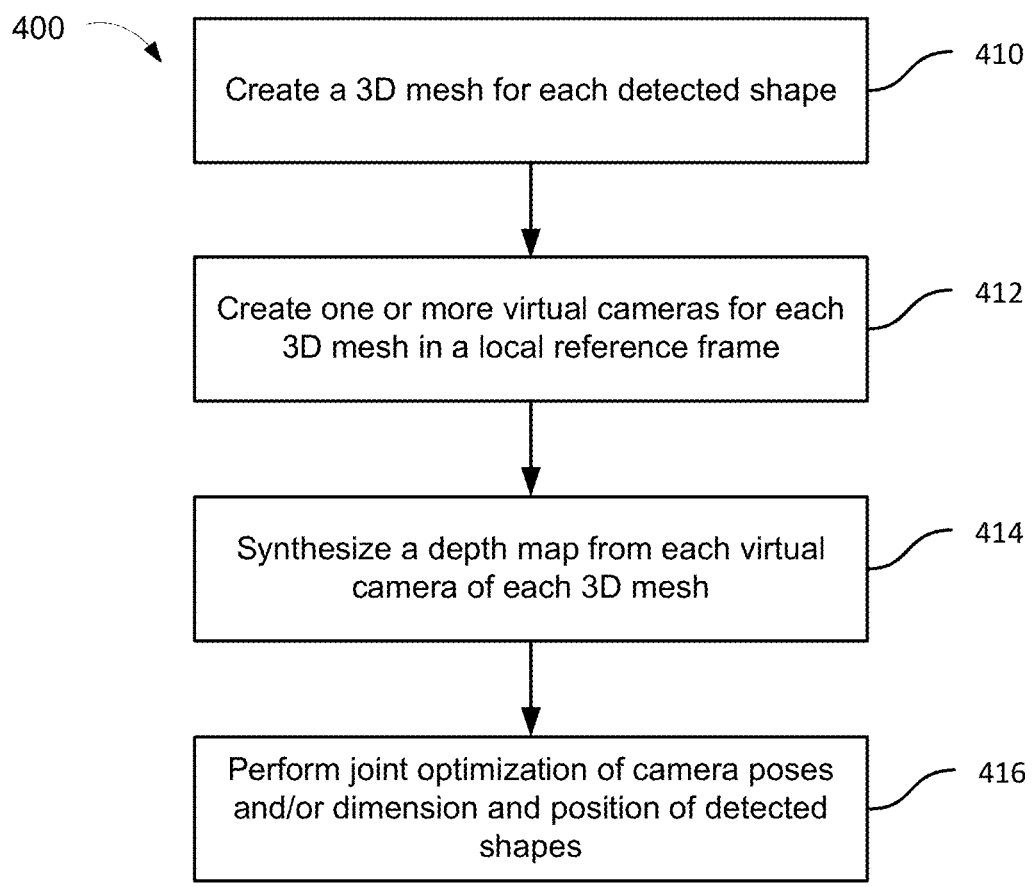
FIG. 4 is a simplified flowchart illustrating a method of performing a shape-aware camera pose alignment according to an embodiment of the present invention.

FIG. 4 is a simplified flowchart illustrating a method of forming a shape-aware camera pose alignment according to an embodiment of the present invention. The method 400 discussed in relation to FIG. 4 can be a method of performing the shape-aware camera pose alignment discussed in relation to process 218 in FIG. 2. As described below, the detected shapes are used in the optimization of camera pose estimation.

Figure 6A:
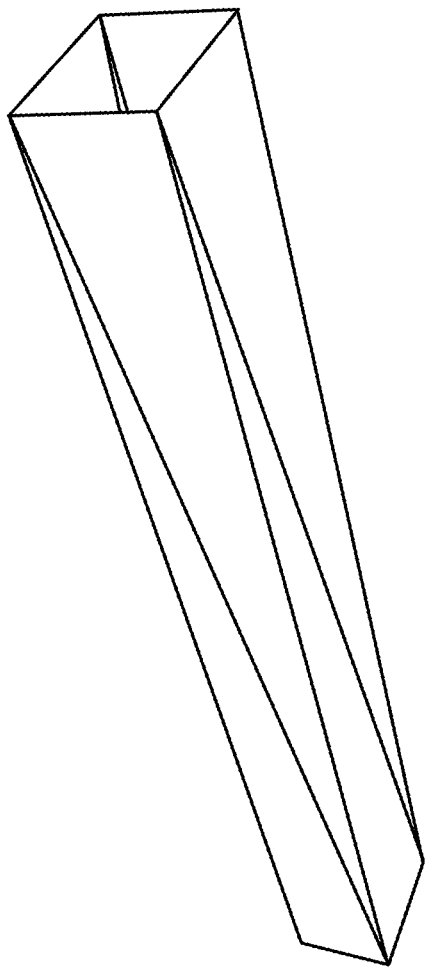
FIG. 6A is a simplified diagram illustrating a 3D mesh of an end of a wall according to an embodiment of the present invention.
Figure 6B:
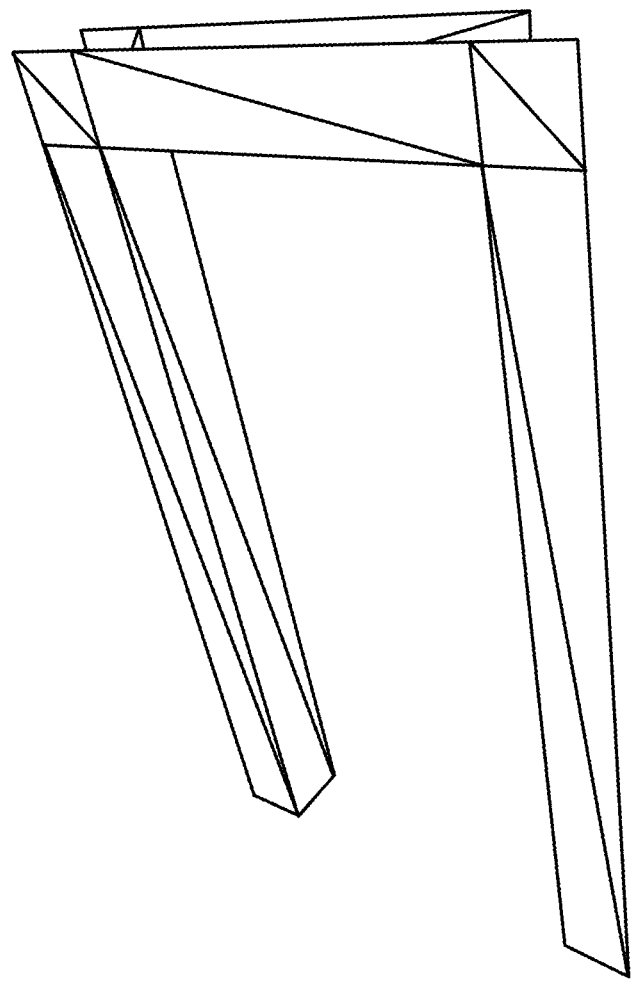
FIG. 6B is a simplified diagram illustrating a 3D mesh of a door frame according to an embodiment of the present invention.

The method 400 includes receiving a set of captured depth maps (410). Each of the captured depth maps is associated with a physical camera pose. The method also includes receiving one or more detected shapes (412). Each shape of the one or more detected shapes is characterized by a dimension and location/orientation. The method includes creating a 3D mesh for each of the one or more detected shapes (410). Examples of created shape meshes can be seen in FIG. 6A and FIG. 6B. As illustrated in FIG. 6A, a 3D mesh of an end of a wall is shown. In FIG. 6B, a 3D mesh of a door frame is shown. These shapes can be detected using the method discussed in relation to FIG. 3. As shown in FIG. 6B, the door frame mesh consists of a plurality of adjoining triangular regions. Although the door frame can have different heights, widths, opening widths, and the like, the angle between the sides and the top of the door frame, as well as other features, will generally be regular and predictable. The 3D mesh associated with the door frame, or other structural feature, will be separate from the mesh that results from process 118 in FIG. 1. As described herein, the shape-aware volumetric fusion utilizes the mesh(es) associated with structural features in forming the shape-aware reconstructed 3D mesh.

The method also includes creating one or more virtual cameras for each 3D mesh in a local reference frame (412). The one or more virtual cameras are created in a local reference frame that is referenced to the detected shape. For a given detected shape, the virtual camera will be positioned in the reference frame of the detected shape. If the position and/or orientation of the detected shape is adjusted, then the virtual camera will adjust to maintain a constant position in the reference frame. If the dimension of the detected shape changes, for example a decrease in the door frame thickness, then the virtual cameras on opposing sides of the door frame will draw closer to each other in conjunction with the decrease in door frame thickness. Thus, every triangle in the 3D mesh for the shape can be viewed by at least one virtual camera. For example, for a wall corner, one virtual camera is enough to cover all triangles, whereas for wall ends or door frames, at least two virtual cameras are typically necessary to cover all triangles. It should be appreciated that these virtual cameras are special since they have a detected shape associated with the virtual camera.

Referring to FIG. 6B, the 3D mesh associated with a door frame is illustrated. After the door frame is detected as discussed in relation to FIG. 2, a 3D mesh as illustrated in FIG. 6B is created. In order to create a virtual camera for the 3D mesh, a rendered depth map associated with the door frame is formed as illustrated in FIG. 7A. Based on the rendered depth map, virtual camera 710 can be created at a predetermined position and orientation.

FIG. 7A is a simplified schematic diagram illustrating a rendered depth map associated with an interior view of a door frame and the associated virtual camera according to an embodiment of the present invention. FIG. 7B is a simplified schematic diagram illustrating a rendered depth map associated with an exterior view of a door frame and the associated virtual camera according to an embodiment of the present invention. The rendered depth map is a subset of a point cloud. The point cloud is formed by combining depth maps (i.e., frames of depth maps). The point cloud can be formed by combining captured depth maps, rendered depth maps, or combinations of captured and rendered depth maps. Referring to FIGS. 7A and 7B, the rendered depth maps includes a set of depth points associated with the structure (i.e., the door frame).

Viewed from the interior side of the door frame, the rendered depth map 705 can be considered as representing the distance from the pixels making up the door frame to the virtual camera 710 for portions of a depth map including the door frame. Viewed from the exterior side of the door frame, the rendered depth map 715 can be considered as representing the distance from the pixels making up the door frame to the virtual camera 720 for portions of a depth map including the door frame. The portion 717 of the rendered depth map 715 represents an open door once it has been swung out from the door frame.

As illustrated in FIG. 7A, the virtual camera can be placed in a position centered on the door frame and at a predetermined distance, for example, 2 meters from the door frame. Thus, for each different shape, different camera positions and orientations can be utilized.

Figure 7C:
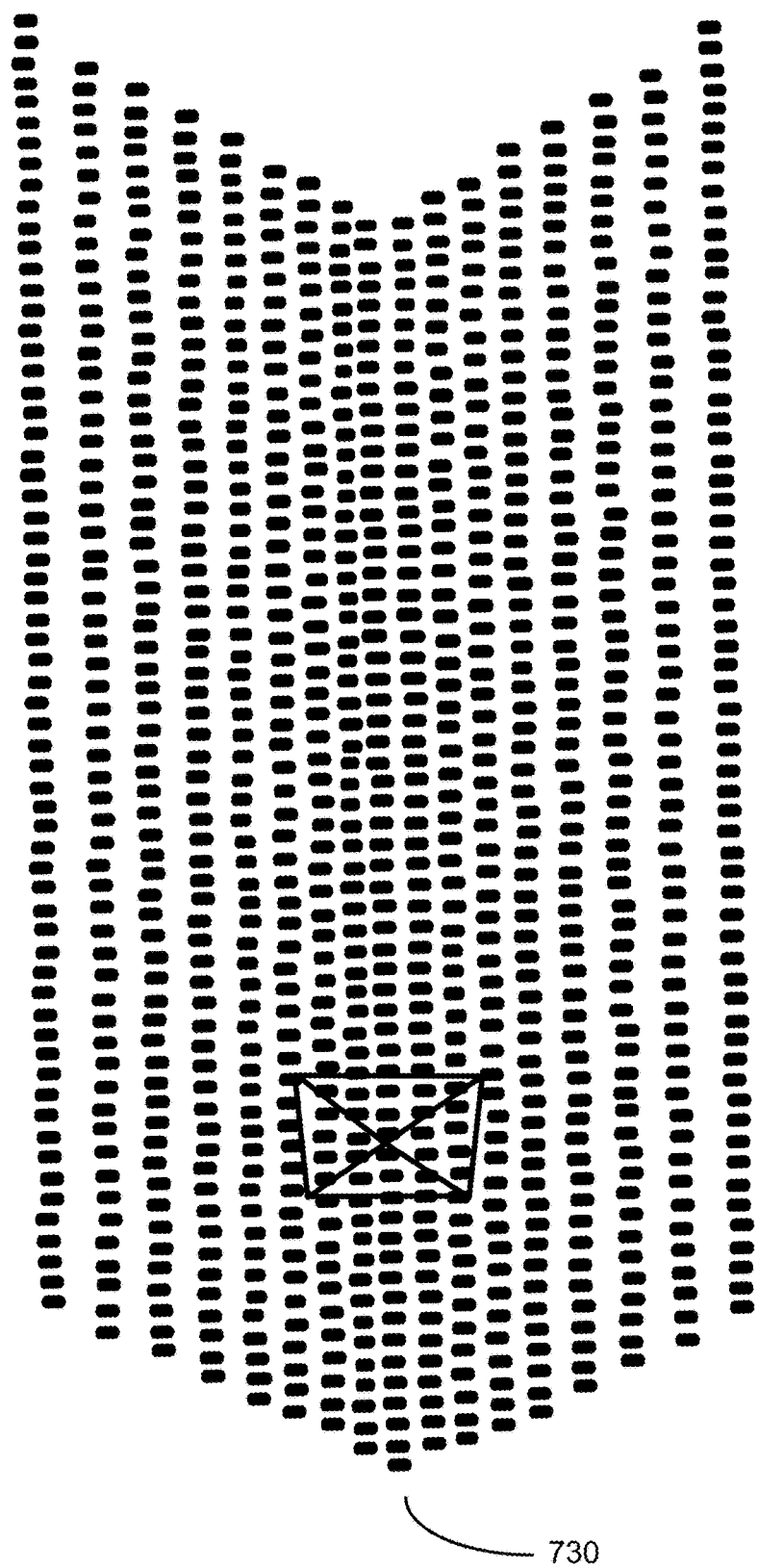
FIG. 7C is a simplified schematic diagram illustrating a rendered depth map associated with a corner of two walls and the associated virtual camera according to an embodiment of the present invention.

FIG. 7C is a simplified schematic diagram illustrating a rendered depth map associated with a corner of two walls and the associated virtual camera according to an embodiment of the present invention. The two walls meet at an angle of 90° in the illustrated embodiment. As illustrated in FIG. 7C, the virtual camera 730 is centered on the corner where the two adjacent walls meet.

The method further includes synthesizing a depth map from each virtual camera of each 3D mesh for each detected shape (414). In other words, for each shape that was detected, the depth map from each virtual camera will be synthesized based on the 3D mesh for the shape. Thus, embodiments provide a depth map associated with each virtual camera.

Figure 8A:
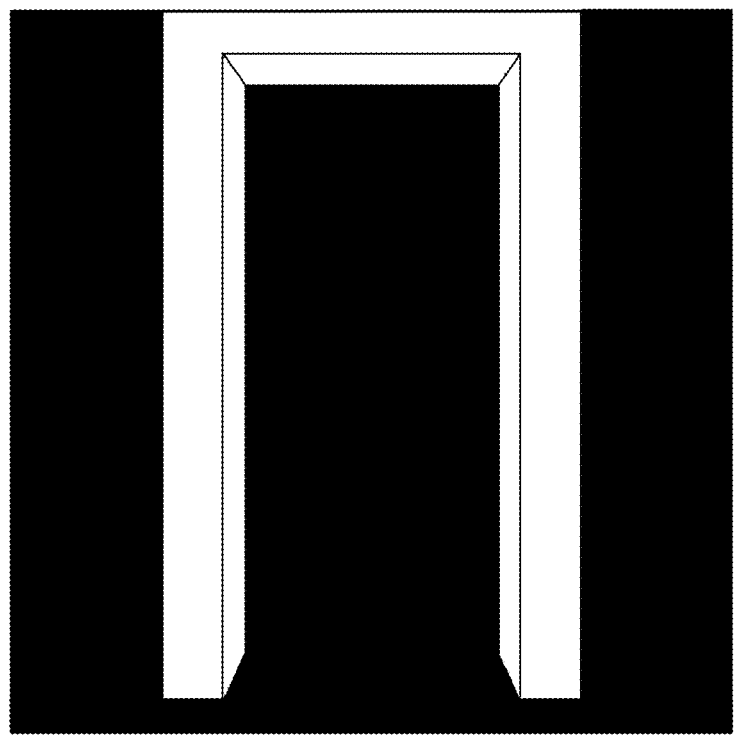
FIG. 8A is a simplified schematic diagram illustrating a rendered depth map of an interior view of a door frame rendered from a virtual camera according to an embodiment of the present invention.
Figure 8B:
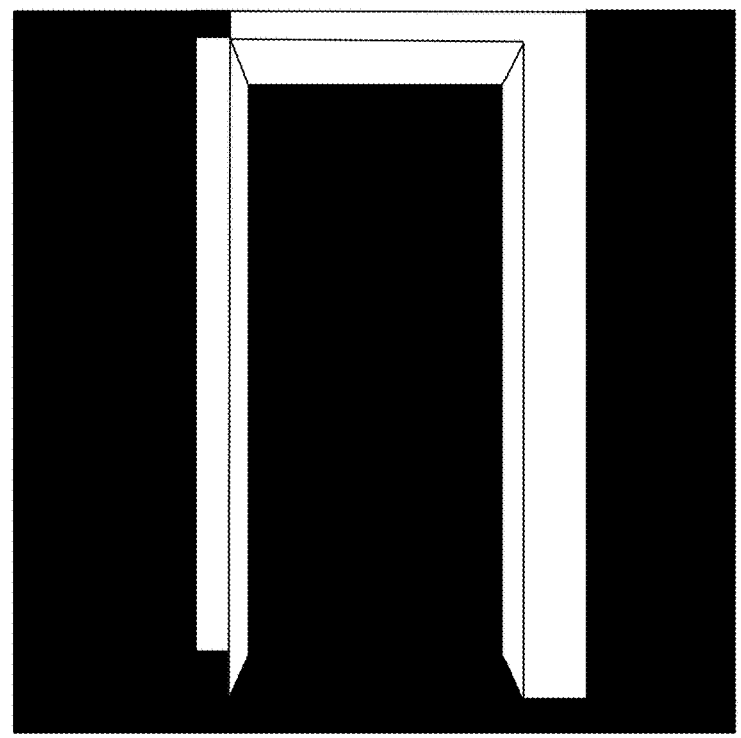
FIG. 8B is a simplified schematic diagram illustrating a rendered depth map of an exterior view of a door frame rendered from a virtual camera according to an embodiment of the present invention.

FIG. 8A is a simplified schematic diagram illustrating a rendered depth map of an interior view of a door frame rendered from a virtual camera according to an embodiment of the present invention. FIG. 8B is a simplified schematic diagram illustrating a rendered depth map of an exterior view of a door frame rendered from a virtual camera according to an embodiment of the present invention. In these depth maps, grey scale is used to represent the depth values. As shown in FIG. 8B, the door is open on the left side of the depth map. Accordingly, the open door occludes a portion of the left side of the door frame. It should be appreciated that the door frame and the door could be treated as two different shapes. One of ordinary skill in the art would recognize many variations, modifications, and alternatives.

The depth map shown in FIG. 8A is associated with the virtual camera 710 illustrated in FIG. 7A. The depth map shown in FIG. 8B is associated with the virtual camera 720 illustrated in FIG. 7B.

The method also includes performing joint optimization of camera poses and/or dimension and position of each detected shape (416). The position of each detected shape correlates with the pose of the rendered depth map. The dimensions are similar. These camera pose alignments utilize the rendered depth maps from process 414 as well as captured depth maps (e.g., passive or active) as part of the joint optimization. The joint optimization, which can also be referred to as pose estimation/refinement can be done using ICP-based alignment or other techniques. Notably, the poses of the rendered depth maps are optionally optimized as part of this process.

Further to the description provided in relation to FIG. 4 and process 416, the process of shape-aware camera pose alignment can include the following steps:

Step 1: find closest point pairs between each frame-frame pair.

Step 2: find closest point pairs between each frame-shape pair.

Step 3: jointly optimize R, T of each frame and F, G and D of each shape with the following objective function.

Step 4: Iterate starting at step 1 until the optimization converges.

Objective Function:

$$w_a \sum_i \sum_j \sum_m \| p_m^i(R_i, T_i) - q_m^j(R_j, T_j) \|^2 +$$

$$w_b \sum_i \sum_k \sum_m \| p_m^i(R_i, T_i) - h_m^k(F_k, G_k, D_k) \|^2 +$$

$$w_c \sum_i \| R_i - R_{i+1} \|^2 = w_d \sum_i \| T_i - T_{i+1} \|^2$$

In the Objective Function, the first term relates to alignment between captured depth maps. The second term relates to alignment between captured depth maps and rendered depth maps (i.e., the detected shapes). The third and fourth terms relate to ensuring that the pose trajectory is smooth.

Figure 9A:
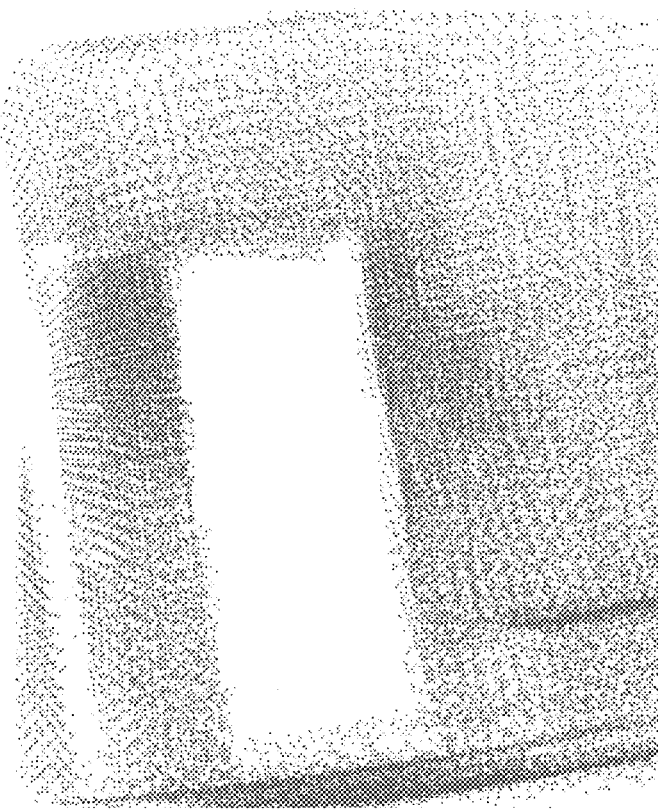
FIG. 9A is a simplified point cloud diagram illustrating overlaid captured depth maps.
Figure 9B:
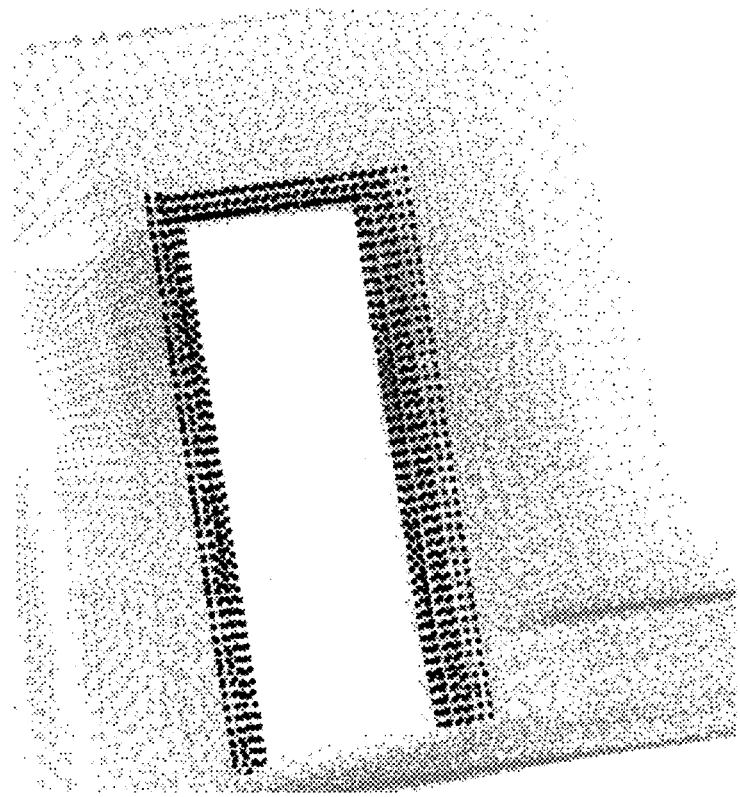
FIG. 9B is a simplified point cloud diagram illustrating overlaid captured depth maps and a rendered depth map using the shape-aware methods provided by embodiments of the present invention.

In the equations above, i provides an index to each frame j provides an index to each other frame m provides an index to each closest point pair $p^i(\cdot)$ and $q^j(\cdot)$ represent a depth point p from frame i and its corresponding closest depth point q from frame j $p^i(\cdot)$ and $h^k(\cdot)$ represent a depth point p from frame i and its corresponding closest depth point h from shape k $R_i$ and $T_i$ relate to rotation and translation (i.e., camera pose) of frame i $F_k$ and $G_k$ relate to rotation and translation (i.e., camera pose) of shape k $D_k$ specifies the dimensions of shape k w represents the weight for each term After the joint optimization of the camera poses has been performed, the original depth images are aligned to the rendered depth maps, and thus aligned to the one or more detected shapes as well. Therefore, the point cloud used for 3D mesh reconstruction will become more accurate and consistent, especially in regions close to noticeable shapes and structures. A comparison of point cloud alignment with and without detected shapes is shown in FIGS. 9A and 9B. FIG. 9A is a simplified point cloud diagram illustrating overlaid captured depth maps. FIG. 9B is a simplified point cloud diagram illustrating overlaid captured depth maps and a rendered depth map using the shape-aware methods provided by embodiments of the present invention. It can be observed that points are better aligned with shape-aware camera pose estimation, as shown in the image shown in FIG. 9B.

It should be appreciated that the specific steps illustrated in FIG. 4 provide a particular method of forming a shape-aware camera pose alignment according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Returning once again to FIG. 2, the method 200 includes performing shape-aware volumetric fusion (220) and forming a reconstructed 3D mesh using shape-aware volumetric fusion techniques (222). Additional description related to the implementation of shape-aware volumetric fusion is provided in relation to FIG. 5.

It should be appreciated that the specific steps illustrated in FIG. 2 provide a particular method of generating a 3D mesh of a scene using multiple frames of captured depth maps according to an embodiment of the present invention. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5:
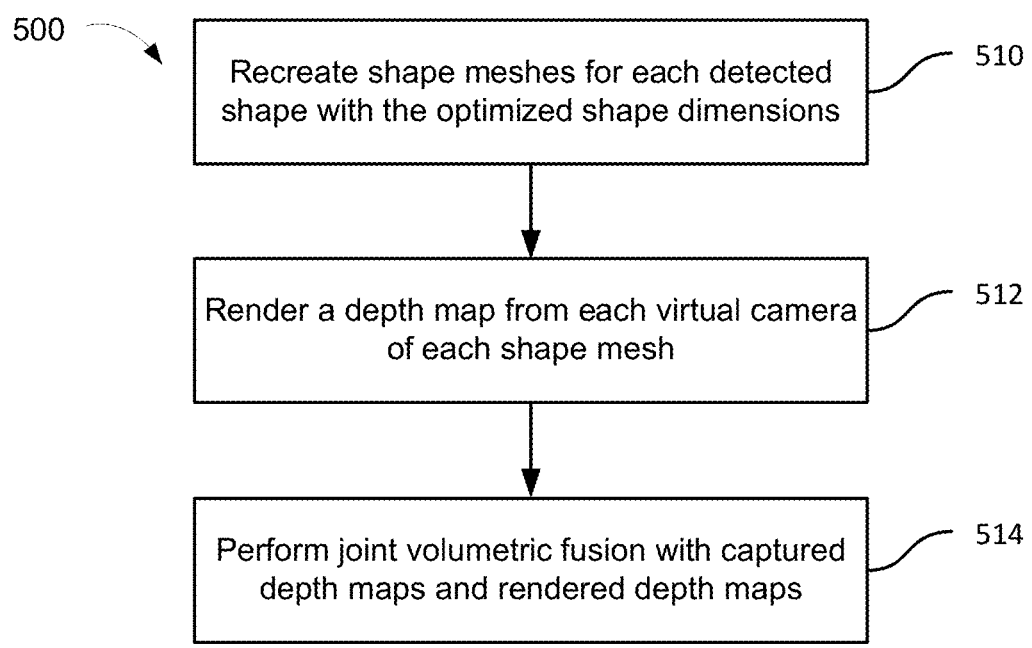
FIG. 5 is a simplified flowchart illustrating a method of performing shape-aware volumetric fusion according to an embodiment of the present invention.

FIG. 5 is a simplified flowchart illustrating a method of performing shape-aware volumetric fusion according to an embodiment of the present invention. In applying this technique, the detected shapes are utilized, resulting in shape meshes that are sharper and cleaner than in other methods.

The method 500 includes recreating shape meshes for each detected shape with the optimized shape dimensions (510). The method also includes rendering a depth map from each virtual camera of each shape mesh (512) and performing joint volumetric fusion with the captured depth maps and the rendered depth maps (514).

The joint volumetric fusion (514) is developed on top of the classic work of volumetric fusion, first introduced in "A volumetric method for building complex models from range images". More specifically, a 3D volume, subdivided uniformly into a 3D grid of voxels, is first created, which maps to the 3D physical space of the captured area. Each voxel of this volumetric representation will hold a value specifying a relative distance to the actual surface. These values are positive in-front of the actual surface and negative behind, so this volumetric representation implicitly describes the 3D surface: the places where the values change sign. Volumetric fusion can convert a set of captured depth maps into this volumetric representation. The distance value, truncated sign-distance function (TSDF), in each voxel is computed as follows:

$$tsdf(v) = \sum_{i=1}^{I} (w_i^v * (D_i(proj_i(v)) - \|v - T_i\|)) / \sum_{i=1}^{I} w_i^v$$

where
v is the position of a voxel
tsdf(v) is the relative distance value of the voxel
$proj_i(v)$ is the projection of v on the captured depth map i
$w_i^v$ is the weight for the voxel v projecting onto the captured depth map i
$D_i(\bullet)$ is the captured depth map i
$T_i$ is the position of camera i
$w_i^v$ will be always set to zero if (1) the voxel v is outside of camera i's frusta or (2)
$|D_i(proj_i(v))-| |v-T_i| \||$ is greater than a predefined truncating distance M. For other cases, $w_i^v$ can be set to one or confidence value of the corresponding point in captured depth maps.

For shape-aware volumetric fusion performed according to embodiments of the present invention, a truncated sign-distance function is computed from both the captured depth maps and rendered depth maps (i.e., detected shapes).

$$tsdf(v) = \sum_{i=1}^{I} (w_i^v * (D_i(proj_i(v)) - \|v - T_i\|)) + \\ \sum_{s=1}^{S} (w_s^v * (E_s(proj_s(v)) - \|v - G_s\|)) / \left(\sum_{i=1}^{I} w_i^v + \sum_{s=1}^{S} w_s^v\right)$$

where
$D_i(\bullet)$ is the rendered depth map s
$G_i$ is the position of the virtual camera s
$w_s^v$ will be set to zero as well if (1) the voxel v is outside of virtual camera s's frusta or (2)
$|E_s(proj_s(v))-| |v-G_s| \||$ is greater than the predefined truncating distance M. When it is not zero, $w_s^v$ is set to a value (i.e., 20) larger than $w_i^v$ (i.e., 1) of a captured depth map, so that points from rendered depth maps will be dominant. Some embodiments also gradually decrease the value of $w_s^v$ (i.e., from 20 to 1) for points getting closer to the boundary of a detected shape. Decreasing weight around the boundary creates a smooth transition from detected shapes, which are sharper, to the original mesh produced using captured depth maps.

After shape-aware volumetric fusion, major structure (e.g., door frames, wall corners, wall ends, etc.) in the final mesh will be much sharper and cleaner.

It should be appreciated that the specific steps illustrated in FIG. 5 provide a particular method of performing shape-aware volumetric fusion according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 10A:
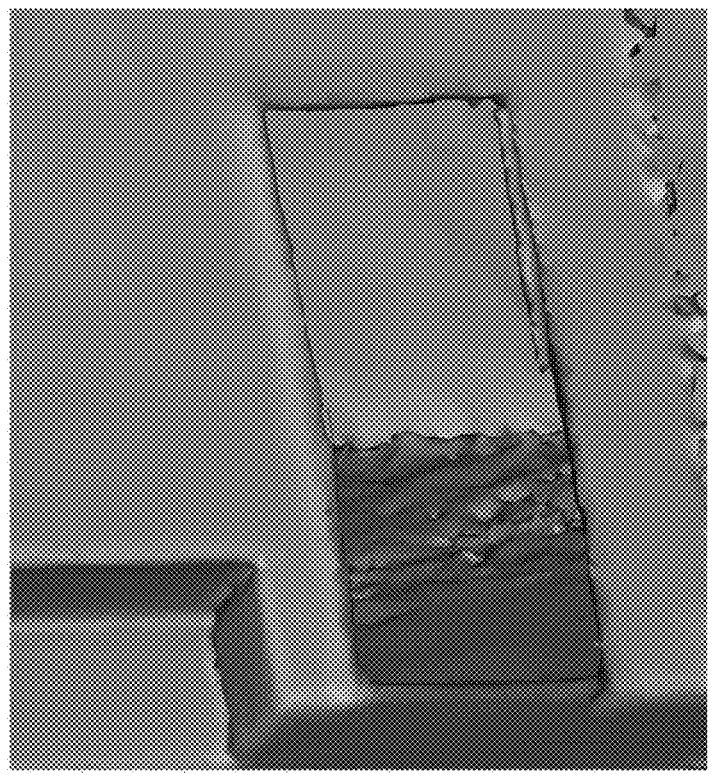
FIG. 10A is an image showing a first reconstructed 3D mesh reconstructed using the method described in relation to FIG. 1.
Figure 10B:
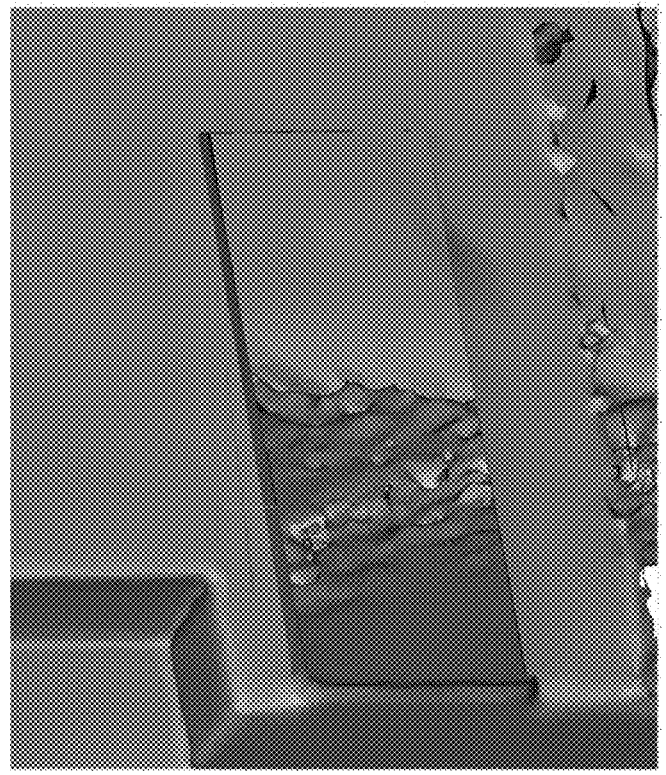
FIG. 10B is an image showing a second reconstructed 3D mesh reconstructed using the method described in relation to FIG. 2.

FIG. 10A is an image showing a first reconstructed 3D mesh reconstructed using the method described in relation to FIG. 1. FIG. 10B is an image showing a second reconstructed 3D mesh reconstructed using the method described in relation to FIG. 2. Thus, FIGS. 10A and 10B provide a comparison of reconstructed 3D meshes without and with shape-aware 3D reconstruction techniques, respectively.

In the image shown in FIG. 10A, which represents a door in a wall, the reconstructed 3D mesh includes waviness along the left edge of the door jamb, as well as along the right edge of the door jamb. In the image shown in FIG. 10B, illustrating the same door shown in FIG. 10A, the shape-aware 3D mesh reconstruction produces a much cleaner and more accurate output. Considering the left edge of the doorjamb, the wall appears to bow out towards the viewer. This bowing, which is not accurately representing the physical scene, most likely results from the errors in the estimate camera poses.

As shown in FIG. 10B, the transition from the door frame shape to the rest of the mesh is smoother, clearly defined by a straight vertical door jamb. Thus, for indoor scenes, embodiments of the present invention provide visually pleasing and accurate 3D mesh reconstructions.

Figure 11A:
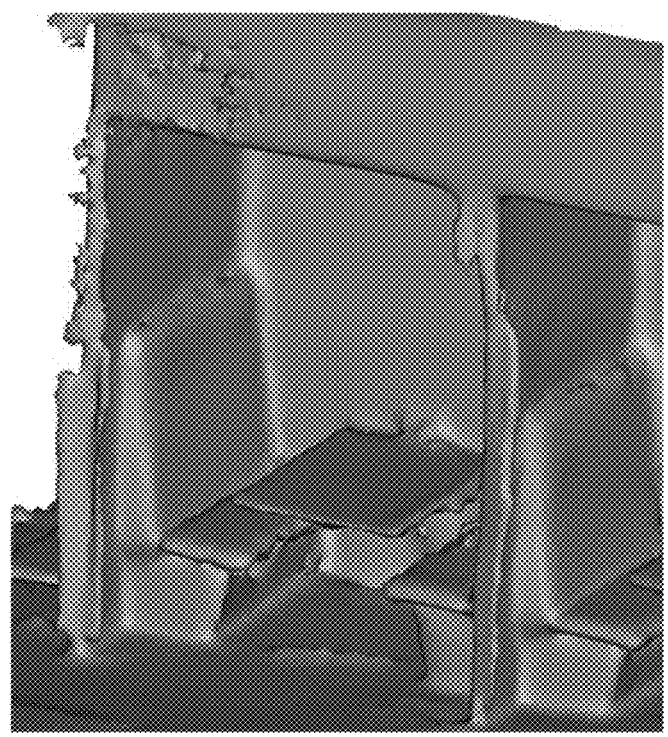
FIG. 11A is an image showing a third reconstructed 3D mesh reconstructed using the method described in relation to FIG. 1.
Figure 11B:
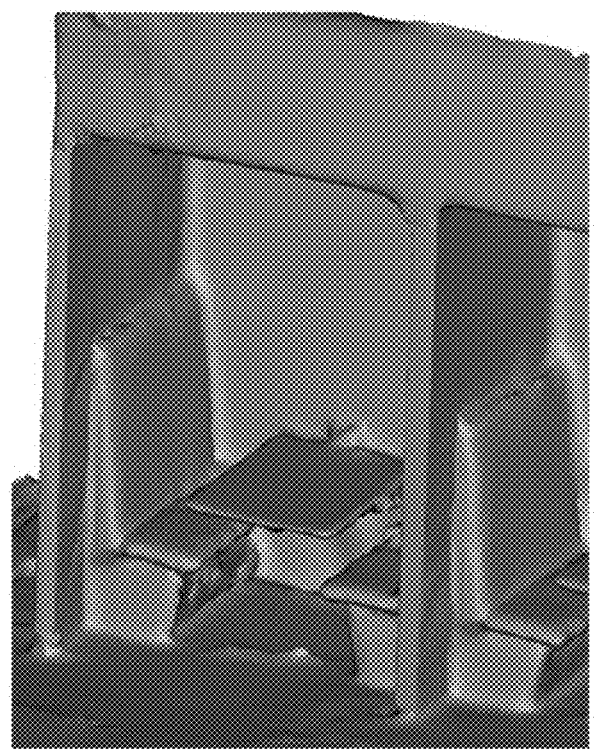
FIG. 11B is an image showing a fourth reconstructed 3D mesh reconstructed using the method described in relation to FIG. 2.

FIG. 11A is an image showing a third reconstructed 3D mesh reconstructed using the method described in relation to FIG. 1. FIG. 11B is an image showing a fourth reconstructed 3D mesh reconstructed using the method described in relation to FIG. 2. Thus, FIGS. 11A and 11B provide a comparison of reconstructed 3D meshes without and with shape-aware 3D reconstruction techniques, respectively.

In the image shown in FIG. 11A, which represents a booth and a table in an alcove, the reconstructed 3D mesh includes waviness in the end of the wall making up the left side of the alcove as well as waviness in the end of the wall making up the right side of the alcove. Additionally, the wall above the alcove exhibits waviness and non-uniformity on the left side of the wall above the bench. In the image shown in FIG. 11B, illustrating the same alcove, bench, and table shown in FIG. 11A, the shape-aware 3D mesh reconstruction produces a much cleaner and more accurate output. In particular, the wall making up the right edge of the alcove appears to extend into the next alcove in FIG. 11A. However, in FIG. 11B, the right side of the left wall is flat, with a clean wall end, clearly separating the adjacent alcoves and accurately representing the physical scene.

Figure 12:
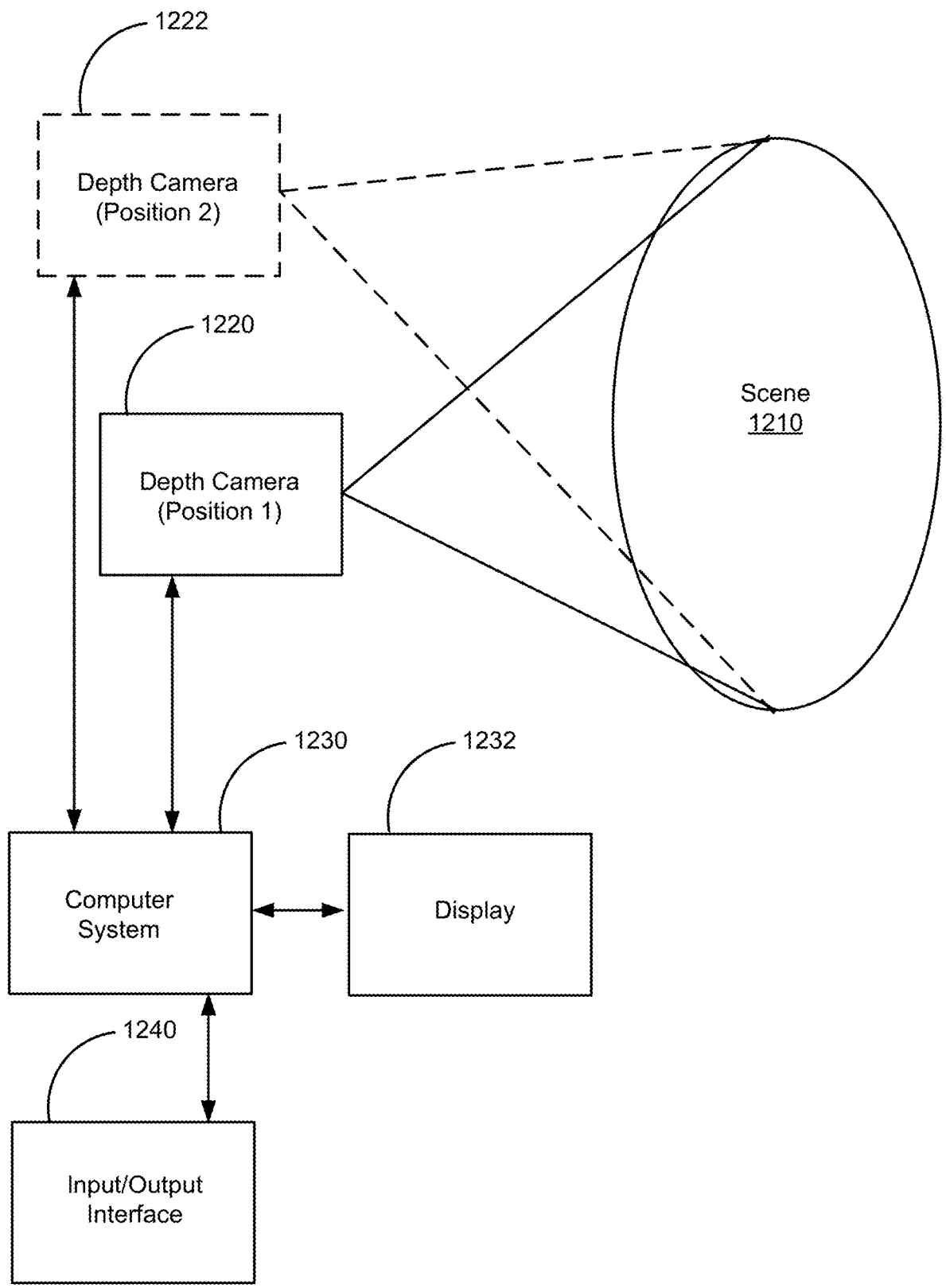
FIG. 12 is a simplified schematic diagram illustrating a system for reconstructing a 3D mesh using captured depth maps according to an embodiment of the present invention.

FIG. 12 is a simplified schematic diagram illustrating a system for reconstructing a 3D mesh using depth images according to an embodiment of the present invention. The system includes a depth camera 1220 that can be used to collect a series of captured depth maps. In this example, a first depth map is captured of scene 1210 with the depth camera a Position 1 and a second depth map is captured of scene 1210 when the camera is positioned at Position 2 (1222).

The set of captured depth maps are transmitted to computer system 1230, which can be integrated with or separate from the depth cameras. The computer system is operable to perform the computational methods described herein and generate reconstructed 3D meshes of scene 1210 for display to a user through display 1232. The reconstructed 3D meshes can be transmitted to other systems through I/O interface 1240, for display, storage, or the like. One of ordinary skill in the art would recognize many variations, modifications, and alternatives.

Figure 13:
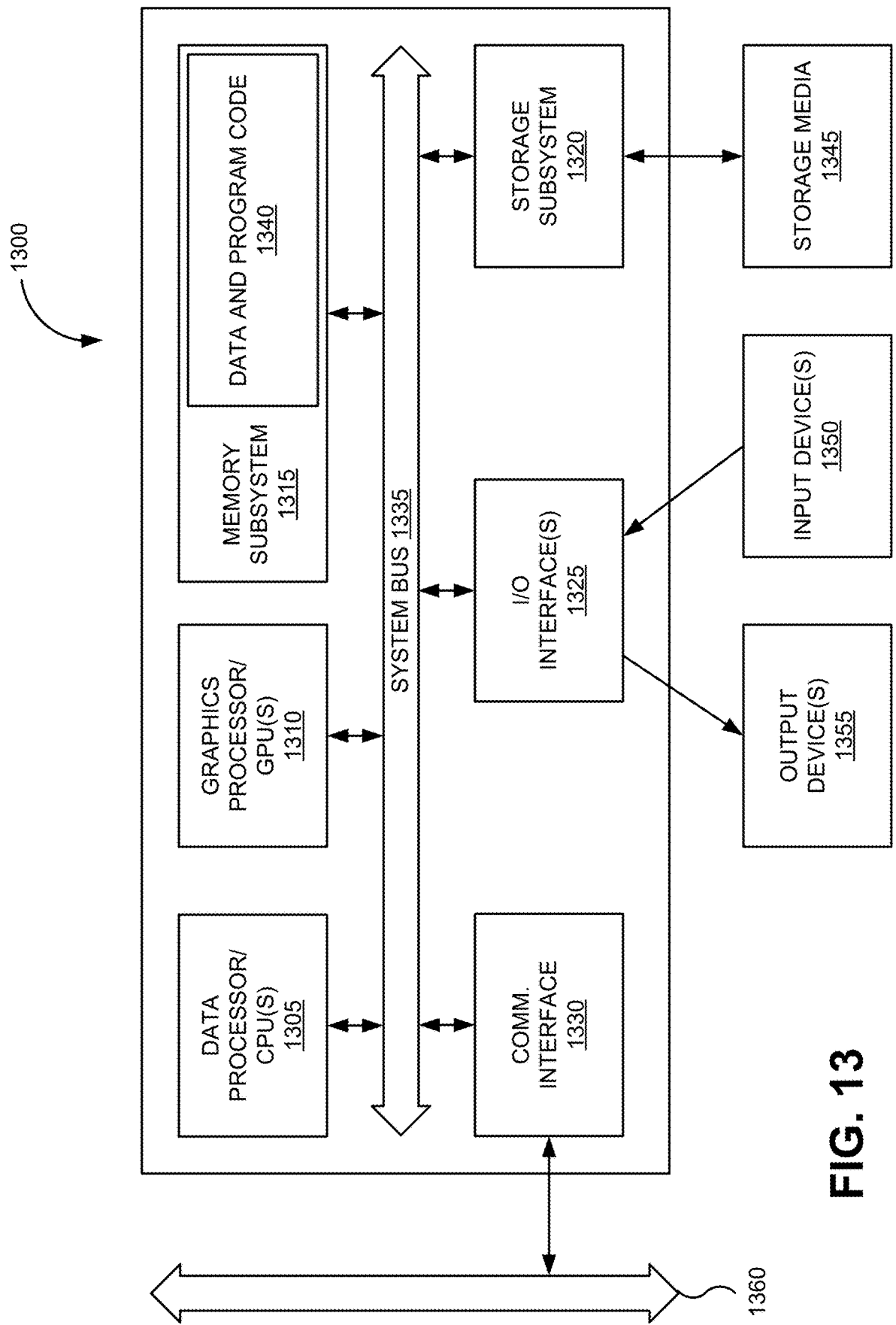
FIG. 13 is a block diagram of a computer system or information processing device that may incorporate an embodiment, be incorporated into an embodiment, or be used to practice any of the innovations, embodiments, and/or examples found within this disclosure.

FIG. 13 is a block diagram of a computer system or information processing device that may incorporate an embodiment, be incorporated into an embodiment, or be used to practice any of the innovations, embodiments, and/or examples found within this disclosure.

FIG. 13 is a block diagram of computer system 1300. FIG. 13 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 1300 and any of its components or subsystems can include hardware and/or software elements configured for performing methods described herein.

Computer system 1300 may include familiar computer components, such as one or more data processors or central processing units (CPUs) 1305, one or more graphics processors or graphical processing units (GPUs) 1310, memory subsystem 1315, storage subsystem 1320, one or more input/output (I/O) interfaces 1325, communications interface 1330, or the like. Computer system 1300 can include system bus 1335 interconnecting the above components and providing functionality, such connectivity as inter-device communication.

The one or more data processors or central processing units (CPUs) 1305 can execute logic or program code or for providing application-specific functionality. Some examples of CPU(s) 1305 can include one or more microprocessors (e.g., single core and multi-core) or micro-controllers, one or more field-gate programmable arrays (FPGAs), and application-specific integrated circuits (ASICs). As user herein, a processor includes a multi-core processor on a same integrated chip, or multiple processing units on a single circuit board or networked.

The one or more graphics processor or graphical processing units (GPUs) 1310 can execute logic or program code associated with graphics or for providing graphics-specific functionality. GPUs 1310 may include any conventional graphics processing unit, such as those provided by conventional video cards. In various embodiments, GPUs 1310 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 1310 may include any number of registers, logic units, arithmetic units, caches, memory interfaces, or the like.

Memory subsystem 1315 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 1315 can include data and program code 1340.

Storage subsystem 1320 can also store information using machine-readable articles, information storage devices, or computer-readable storage media. Storage subsystem 1320 may store information using storage media 1345. Some examples of storage media 1345 used by storage subsystem 1320 can include floppy disks, hard disks, optical storage media such as CD-ROMs, DVDs and bar codes, removable storage devices, networked storage devices, or the like. In some embodiments, all or part of data and program code 1340 may be stored using storage subsystem 1320.

The one or more input/output (I/O) interfaces 1325 can perform I/O operations. One or more input devices 1350 and/or one or more output devices 1355 may be communicatively coupled to the one or more I/O interfaces 1325. The one or more input devices 1350 can receive information from one or more sources for computer system 1300. Some examples of the one or more input devices 1350 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 1350 may allow a user of computer system 1300 to interact with one or more non-graphical or graphical user interfaces to enter a comment, select objects, icons, text, user interface widgets, or other user interface elements that appear on a monitor/display device via a command, a click of a button, or the like.

The one or more output devices 1355 can output information to one or more destinations for computer system 1300. Some examples of the one or more output devices 1355 can include a printer, a fax, a feedback device for a mouse or joystick, external storage systems, a monitor or other display device, a communications interface appropriately configured as a transceiver, or the like. The one or more output devices 1355 may allow a user of computer system 1300 to view objects, icons, text, user interface widgets, or other user interface elements. A display device or monitor may be used with computer system 1300 and can include hardware and/or software elements configured for displaying information.

Communications interface 1300 can perform communications operations, including sending and receiving data. Some examples of communications interface 1300 may include a network communications interface (e.g. Ethernet, Wi-Fi, etc.). For example, communications interface 1300 may be coupled to communications network/external bus 1360, such as a computer network, a USB hub, or the like. A computer system can include a plurality of the same components or subsystems, e.g., connected together by communications interface 1330 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 1300 may also include one or more applications (e.g., software components or functions) to be executed by a processor to execute, perform, or otherwise implement techniques disclosed herein. These applications may be embodied as data and program code 1340. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 1315 and/or storage subsystem 1320.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

While various embodiments of the invention have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of updating camera poses, the method comprising:
   receiving, at one or more processors, a set of captured depth maps, each of the captured depth maps being associated with a physical camera pose, the set of captured depth maps comprising a scene;
   detecting, using the one or more processors, a first shape and a second shape present in the scene, the first shape characterized by a first dimension and/or first location/orientation, and the second shape characterized by a second dimension and/or second location/orientation;
   creating, using the one or more processors, a first 3D mesh for the first shape;
   creating, using the one or more processors, a first virtual camera associated with the first 3D mesh in a first local reference frame;
   rendering, using the one or more processors, a first depth map, the first depth map associated with the first virtual camera;
   creating, using the one or more processors, a second 3D mesh for the second shape;

creating, using the one or more processors, a second virtual camera associated with the second 3D mesh in a second local reference frame;

rendering, using the one or more processors, a second depth map, the second depth map associated with the second virtual camera;

identifying, using the one or more processors, a subset of captured depth maps, each of the captured depth maps in the subset comprising at least a first portion of the first shape or a second portion of the second shape; and updating the physical camera poses associated with the subset of captured depth maps to provide updated physical camera poses by jointly solving, using the one or more processors, the first shape, and the second shape, for the physical camera poses, the first dimension and first location/orientation, and the second dimension and second location/orientation by optimizing an alignment between the first depth map, the second depth map, and the subset of captured depth maps.

2. The method of claim 1 wherein detecting the first shape and the second shape comprises:

determining, using the one or more processors and for a plurality of pixels in a point cloud, a plurality of horizontal planes defined, for each of the plurality of pixels, by point normals of neighboring pixels to each of the plurality of pixels;

computing, using one or more processors, a vector normal to the plurality of horizontal planes, the vector defining a vertical direction associated with the point cloud;

forming, using the one or more processors, a virtual plane orthogonal to the vertical direction;

projecting, using the one or more processors, the pixels of the point cloud onto the virtual plane to generate a two-dimensional data set representing a number of points of the point cloud associated with a predetermined position in the virtual plane;

calculating, using the one or more processors, projection statistics for the points of the point cloud;

detecting, using the one or more processors, a plurality of lines from the calculated projection statistics, the plurality of lines being associated with vertical walls; and detecting, using the one or more processors, the first shape and the second shape from the projection statistics and the plurality of detected lines.

3. The method of claim 1 wherein the physical camera poses associated with the subset of captured depth maps comprises a first physical camera pose and a second physical camera pose, the first physical camera pose associated with a first captured depth map of the subset of captured depth maps, the second physical camera pose associated with a second captured depth map of the subset of captured depth maps, and wherein the first captured depth map corresponds to a portion of the first depth map and the second captured depth map corresponds to a portion of the second depth map.

4. The method of claim 1 wherein optimizing the alignment between the first depth map, the second depth map, and the subset of captured depth maps comprises:

optimizing the alignment between the first depth map and the second depth map;

optimizing the alignment between the first depth map and the subset of captured depth maps; and optimizing the alignment between the second depth map and the subset of captured depth maps.

5. The method of claim 1 wherein the first 3D mesh for the first shape comprises a plurality of triangles and wherein at least a portion of the plurality of triangles is in a first field of view of the first virtual camera.

6. The method of claim 5 further comprising:

creating, using the one or more processors, a third virtual camera associated with the first 3D mesh, wherein a second portion of the plurality of triangles is in a second field of view of the third virtual camera, and wherein each triangle of the plurality of triangles is in at least one of the first field of view and the second field of view.

7. The method of claim 1 wherein the first local reference frame comprises a first reference frame of the first shape.

8. The method of claim 1 wherein the second local reference frame comprises a second reference frame of the second shape.

9. The method of claim 1 wherein the set of captured depth maps are obtained from different positions with respect to a scene.

10. The method of claim 1 wherein the set of captured depth maps are obtained from a single position with respect to a scene at different times.

11. A system for updating camera poses, the system comprising:

a depth camera; and one or more processors communicatively coupled to the depth camera, wherein the one or more processors are configured to perform operations including:

obtaining, by the depth camera, a set of captured depth maps, each of the captured depth maps being associated with a physical camera pose, the set of captured depth maps comprising a scene;

detecting a first shape and a second shape present in the scene, the first shape characterized by a first dimension and/or first location/orientation, and the second shape characterized by a second dimension and/or second location/orientation;

creating a first 3D mesh for the first shape;

creating a first virtual camera associated with the first 3D mesh in a first local reference frame;

rendering a first depth map, the first depth map associated with the first virtual camera;

creating a second 3D mesh for the second shape;

creating a second virtual camera associated with the second 3D mesh in a second local reference frame;

rendering a second depth map, the second depth map associated with the second virtual camera;

identifying a subset of captured depth maps, each of the captured depth maps in the subset comprising at least a first portion of the first shape or a second portion of the second shape; and updating the physical camera poses associated with the subset of captured depth maps to provide updated physical camera poses by jointly solving, using the first shape and the second shape, for the physical camera poses, the first dimension and first location/orientation, and the second dimension and second location/orientation by optimizing an alignment between the first depth map, the second depth map, and a subset of the set of captured depth maps.

12. The system of claim 11 wherein the one or more processors are configured to detect the first shape and the second shape by performing additional operations including:

determining, for a plurality of pixels in a point cloud, a plurality of horizontal planes defined, for each of the plurality of pixels, by point normals of neighboring pixels to each of the plurality of pixels;

computing a vector normal to the plurality of horizontal planes, the vector defining a vertical direction associated with the point cloud;

forming, using the one or more processors, a virtual plane orthogonal to the vertical direction;

projecting the pixels of the point cloud onto the virtual plane to generate a two-dimensional data set representing a number of points of the point cloud associated with a predetermined position in the virtual plane;

calculating projection statistics for the points of the point cloud;

detecting a plurality of lines from the calculated projection statistics, the plurality of lines being associated with vertical walls; and detecting the first shape and the second shape from the projection statistics and the plurality of detected lines.

13. The system of claim 11 wherein the physical camera poses associated with the subset of captured depth maps comprises a first physical camera pose and a second physical camera pose, the first physical camera pose associated with a first captured depth map of the subset of captured depth maps, the second physical camera pose associated with a second captured depth map of the subset of captured depth maps, and wherein the first captured depth map corresponds to a portion of the first depth map and the second captured depth map corresponds to a portion of the second depth map.

14. The system of claim 11 wherein the one or more processors are configured to optimize the alignment between the first depth map, the second depth map, and the subset of captured depth maps by performing additional operations including:
    optimizing the alignment between the first depth map and the second depth map;
    optimizing the alignment between the first depth map and the subset of captured depth maps; and
    optimizing the alignment between the second depth map and the subset of captured depth maps.

15. The system of claim 11 wherein the first 3D mesh for the first shape comprises a plurality of triangles and wherein at least a portion of the plurality of triangles is in a first field of view of the first virtual camera.

16. The system of claim 15, wherein the one or more processors are configured to perform additional operations including:
    creating a third virtual camera associated with the first 3D mesh, wherein a second portion of the plurality of triangles is in a second field of view of the third virtual camera, and wherein each triangle of the plurality of triangles is in at least one of the first field of view and the second field of view.

17. A system for forming a reconstructed 3D mesh, the system comprising:

a depth camera; and one or more processors communicatively coupled to the depth camera, wherein the one or more processors are configured to perform operations comprising:
    obtaining, by the depth camera, a set of captured depth maps associated with a scene;
    performing an initial camera pose alignment associated with each captured depth map of the set of captured depth maps;
    overlaying the set of captured depth maps in a reference frame;
    detecting one or more shapes in the overlaid set of captured depth maps, thereby providing one or more detected shapes;
    updating, using the one or more detected shapes, the initial camera pose alignment based on an overlap between the overlaid set of captured depth maps and the one or more detected shapes to provide a shape-aware camera pose alignment associated with each captured depth map of the set of captured depth maps;
    performing, using the one or more detected shapes, shape-aware volumetric fusion; and
    forming the reconstructed 3D mesh associated with the scene.

18. The system of claim 17 wherein the reference frame comprises a reference frame of one of the one or more detected shapes.

19. The system of claim 17 wherein the detected one or more shapes comprise at least one of a wall corner or a door frame.

20. The system of claim 17 wherein the one or more processors are configured to provide the shape-aware camera pose alignment associated with each captured depth map of the set of captured depth maps by performing additional operations including:
    creating a 3D mesh for each of the one or more detected shapes; wherein the overlaid set of captured depth maps are associated with a physical camera pose and each of the one or more detected shapes are characterized by a dimension and location/orientation;
    creating one or more virtual cameras associated with each 3D mesh in a local reference frame;
    rendering one or more depth maps, each of the one or more rendered depth maps being associated with each virtual camera associated with each 3D mesh; and
    jointly solving for the physical camera poses and location/orientation of each shape of the one or more detected shapes by optimizing an alignment between the one or more rendered depth maps and the set of captured depth maps.

* * * * *